(12) United States Patent
Gregoire et al.

(10) Patent No.: US 6,748,522 B1
(45) Date of Patent: Jun. 8, 2004

(54) PERFORMANCE MONITORING BASED ON INSTRUCTION SAMPLING IN A MICROPROCESSOR

(75) Inventors: Dennis Gerard Gregoire, Austin, TX (US); Alexander Erik Mericas, Austin, TX (US); Joel M. Tendler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 09/703,346

(22) Filed: Oct. 31, 2000

(51) Int. Cl.$^7$ .................................................. G06F 11/30

(52) U.S. Cl. ....................................... 712/227; 717/127

(58) Field of Search ........................... 712/227; 717/127, 717/128, 129, 130, 131

(56) References Cited

U.S. PATENT DOCUMENTS

| | | | | |
|---|---|---|---|---|
| 4,771,429 A | * | 9/1988 | Davis et al. | 714/739 |
| 5,151,981 A | * | 9/1992 | Westcott et al. | 714/50 |
| 6,195,748 B1 | * | 2/2001 | Chrysos et al. | 712/227 |
| 6,539,502 B1 | * | 3/2003 | Davidson et al. | 714/47 |
| 6,574,727 B1 | * | 6/2003 | Davidson et al. | 712/227 |

* cited by examiner

*Primary Examiner*—Eddie Chan
*Assistant Examiner*—Barry O'Brien
(74) *Attorney, Agent, or Firm*—Joseph P. Lally; Casimer K. Salys (57) ABSTRACT

The problem identified above is addressed in large part by a microprocessor as disclosed herein. The microprocessor includes a dispatch unit configured to receive a set of instructions from an instruction cache and to forward the set of instructions to an issue queue when the instructions are ready for execution. The dispatch unit may include sampling logic that is configured to select one of the instructions for performance monitoring from the set of instructions. The microprocessor further includes a performance monitor unit enabled to monitor performance characteristics of the selected instruction as it executes. The sampling logic may identify the instruction selected for monitoring as the instruction occupying an eligible position within the set of instructions. The eligible position from which the monitored instruction is selected may vary with each subsequent set of instructions. The sampling logic may include a selection mask that contains an asserted bit that identifies the position within the set of instructions from which the selected instruction is chosen. The selection mask may include a single bit for each position in the set of instructions and may be implemented as a shift register that periodically rotates the eligible position. The rotation of the eligible bit position may occur every clock cycle, every dispatch cycle, or at some another suitable synchronous or asynchronous interval. The selection mask may contain multiple asserted bits and may include a filter circuit that generates a selection vector based on the selection mask where the selection vector includes only a single asserted bit.

17 Claims, 5 Drawing Sheets

FIG. 1

EXAMPLE 1

EXAMPLE 2

EXAMPLE 3

FIG. 2

| GTAG 308 | instruction address 304 | status 306 | | |
|---|---|---|---|---|
| | | | V | S |
| ... | ... | ... | | |
| | | | V | S |

PERFORMANCE MONITORING BASED ON INSTRUCTION SAMPLING IN A MICROPROCESSOR

RELATED APPLICATION

The subject matter of this application is related to the subject matter disclosed in a U.S. Patent application entitled Method and Apparatus for Instruction Sampling for Performance Monitoring and Debug, Ser. No. 09/435,069, now U.S. Pat. No. 6,574,721 filed Nov. 4, 1999, which shares a common inventor and assignee with present application and is incorporated by reference herein.

BACKGROUND

1. Field of the Present Invention

The present invention is related to the field of superscalar microprocessors, and more particularly to the sampling of microprocessor instructions for analyzing and optimizing the processor design.

2. History of Related Art

Advanced processors typically provide facilities to enable the processor to count occurrences of software-selectable events and to time the execution of processes within an associated data processing system. These facilities are typically referred as performance monitors. Performance monitoring provides the ability to optimize software that is to be used by the system. A performance monitor may comprise any facility that is incorporated into the processor and is capable of monitoring selectable characteristics of the processors. A performance monitor may produce information relating to the utilization of a processor's instructions execution and storage control. The performance monitor can provide information, for example, regarding the amount of time that has passed between events in a processing system. A software engineer may use the timing data gathered with the performance monitor to optimize programs by relocating branch instructions and memory accesses (as just two examples). A performance monitor may also be used to gather data about the access times to the data processing system's L1 cache, L2 cache, and main memory. Using this data, system designers may identify performance bottlenecks specific to particular software or hardware environments. The information generated by performance monitors usually guides system designers toward ways of enhancing performance of a given system or of developing improvements in the design of a new system.

A performance monitor typically includes a register that is configured to count the occurrence of one or more specified events. Typically, a programmable control register permits a user to select the events within the system to be monitored and specifies the conditions under which the counters are enabled. Typically, it is considered unnecessary and highly impractical to monitor every instruction that is executed by a microprocessor due to the extremely large number of instructions that are executed in a short period of time. Instead, performance monitoring is typically enabled for only a sample of instructions. Detailed information about the sample instructions is collected as the instructions execute. Typically, instruction sampling is based upon a deterministic variable such as the instruction's location within an internal queue of the processor. When the sample instructions are based upon such criteria, the instructions that are sampled for monitoring may not accurately represent the mix of instructions that are being executed by the hardware. Therefore, it would be desirable to implement a method of randomly sampling or selecting instructions for performance monitoring.

SUMMARY OF THE INVENTION

The problem identified above is addressed in large part by a microprocessor as disclosed herein. The microprocessor includes a dispatch unit configured to receive a set of instructions from an instruction cache and to forward the set of instructions to an execution unit when the instructions are ready for execution. The dispatch unit may include sampling logic that is configured to select one of the instructions for performance monitoring from the set of instructions. The microprocessor further includes a performance monitor unit enabled to monitor performance characteristics of the selected instruction as it executes. The sampling logic may identify the instruction selected for monitoring as the instruction occupying an eligible position within the set of instructions. The eligible position from which the monitored instruction is selected may vary with each subsequent set of instructions. The sampling logic may include a selection mask that contains an asserted bit that identifies the position within the set of instructions from which the selected instruction is chosen. The selection mask may include a single bit for each position in the set of instructions and may be implemented as a shift register that periodically rotates the eligible position. The rotation of the eligible bit position may occur every clock cycle, every dispatch cycle, or at some another suitable synchronous or asynchronous interval. The selection mask may contain multiple asserted bits and may include a filter circuit that generates a selection vector based on the selection mask where the selection vector includes only a single asserted bit.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
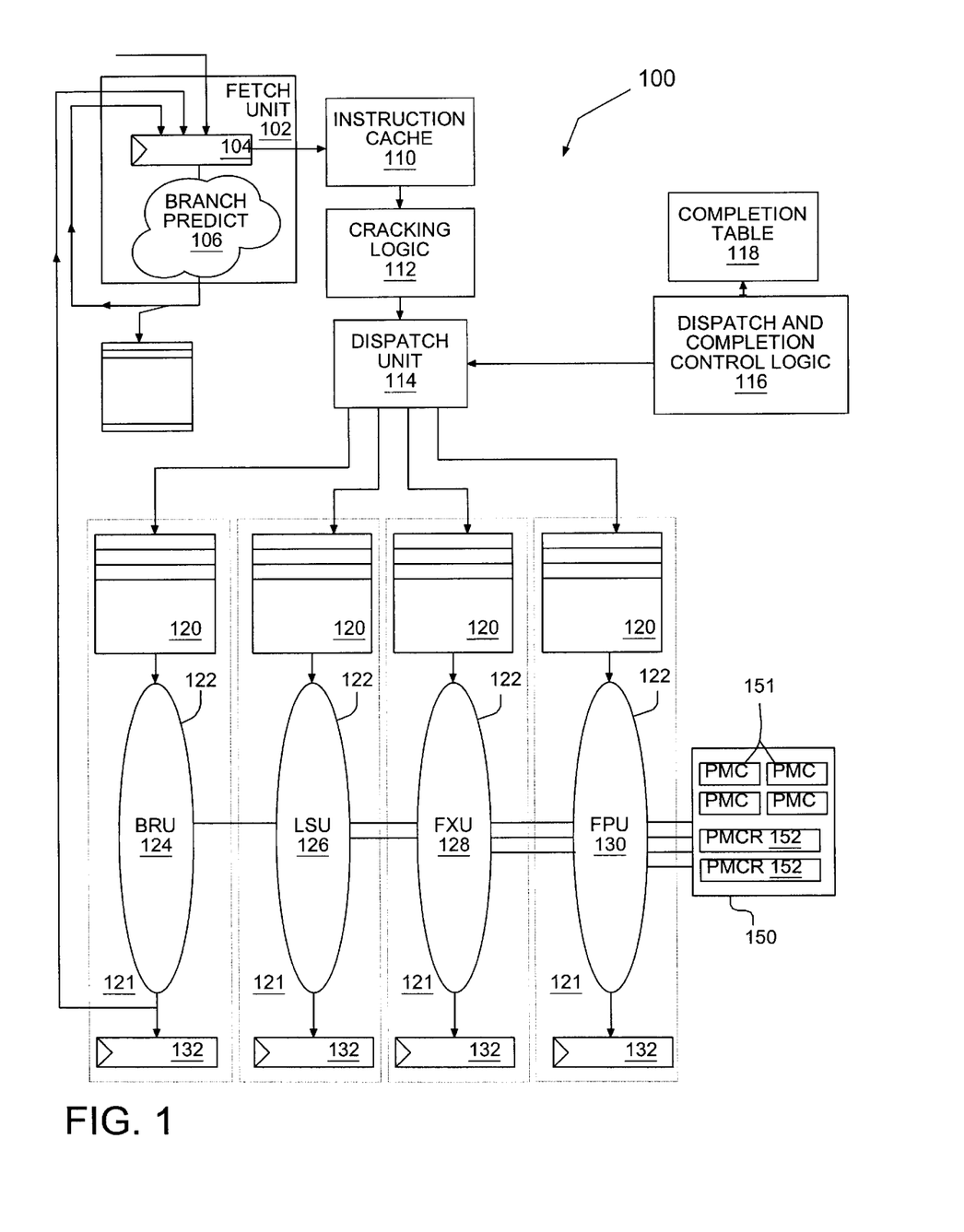
FIG. 1 is a simplified block diagram of a microprocessor according to one embodiment of the invention.

Turning now to the drawings, FIG. 1 is a simplified block diagram of a processor 100 according to one embodiment of the present invention. Processor 100 as depicted in FIG. 1 includes an instruction fetch unit 102 suitable for generating an address of the next instruction to be fetched. The fetched instruction address generated by fetch unit 102 is loaded into a next instruction address latch 104 and provided to an instruction cache 110. Fetch unit 102 further includes branch prediction logic 106. As its name suggests, branch prediction logic 106 is adapted to make an informed prediction of the outcome of a decision that effects the program execution flow. The ability to correctly predict branch decisions is a significant factor in the overall ability of processor 100 to achieve improved performance by executing instructions speculatively and out-of-order. The address produced by fetch unit 102 is provided to an instruction cache 110, which contains a subset of the contents of system memory in a high-speed storage facility. If the address instruction generated by fetch unit 102 corresponds to a system memory location that is currently replicated in instruction cache 110, instruction cache 110 forwards the corresponding instruction to cracking logic 112. If the instruction corresponding to the instruction address generated by fetch unit 102 does not currently reside in instruction cache 110, the contents of instruction cache 110 must be updated with the contents of the appropriate locations in system memory before the instruction can be forwarded to cracking logic 112.

Cracking logic 112 is adapted to modify an incoming instruction stream to produce a set of instructions optimized for executing in an underlying execution pipeline at extremely high operating frequencies (i.e., operating frequencies of approximately 1 GHz). In one embodiment, for example, cracking logic 112 receives instructions in a 32-bit wide format such as the instruction set supported by the PowerPCO microprocessor. Detailed information regarding the PowerPC® instruction set is available in the *PowerPC 620 RISC Microprocessor User's Manual* available from Motorola, Inc. (Order No. MPC620UM/AD), which is incorporated by reference herein.

In one embodiment, the format of instructions generated by cracking logic 112 includes explicit fields for information that is merely implied in the format of the fetched instructions such that the instructions generated by cracking logic 112 are wider than received instructions. In one embodiment, for example, the fetched instructions are encoded according to a 32-bit instruction format and the format of instructions generated by cracking logic 112 is 64 or more bits wide. Cracking logic 112 is designed to generate these wide instructions according to a predefined set of cracking rules. The wide instructions generated by cracking logic 112 facilitate high-speed execution by including explicit references to instruction operands.

Figure 2:
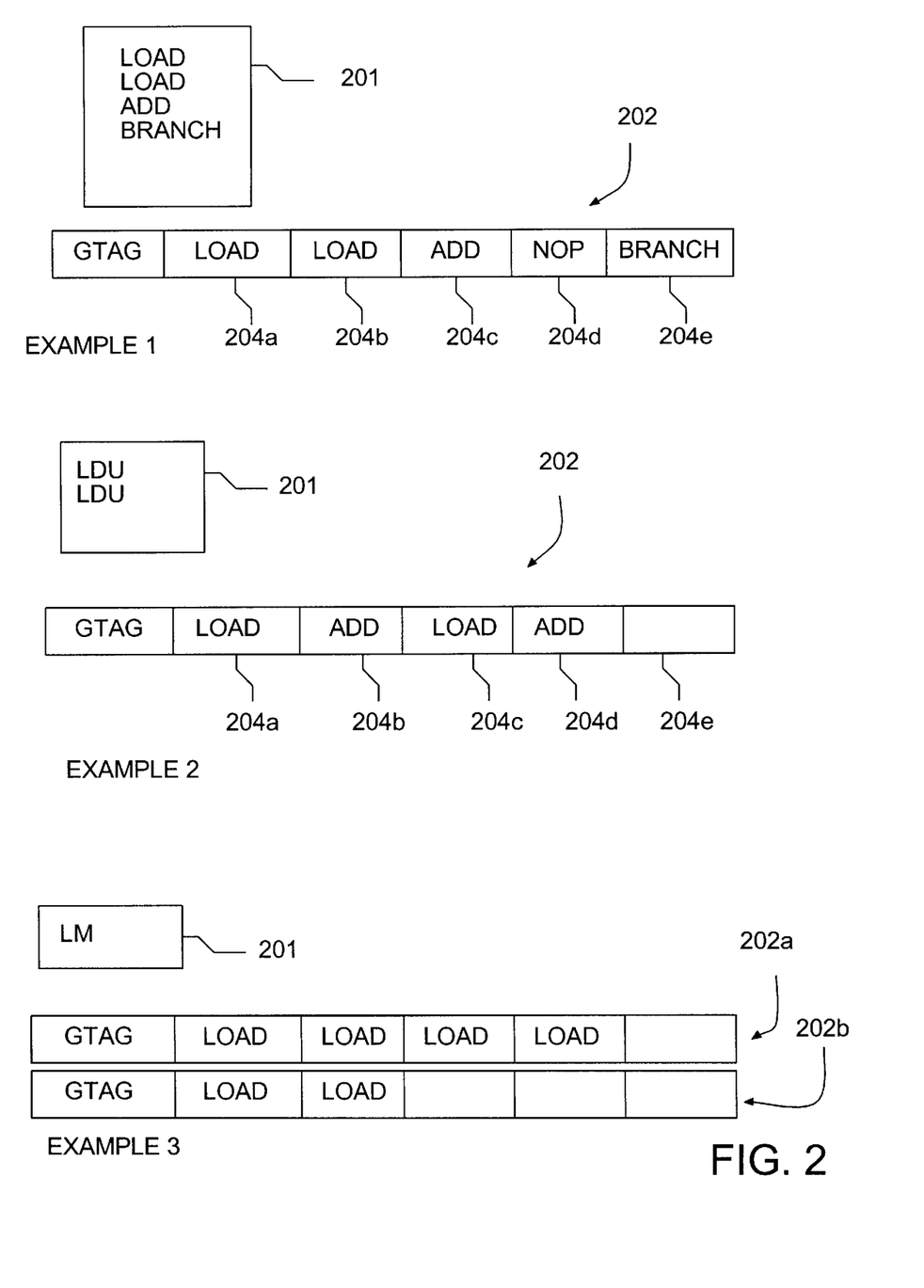
FIG. 2 depicts examples of instruction groups generated by the cracking unit of the processor of FIG. 1.

Cracking logic 112 as contemplated herein may be configured to organize a set of fetched instructions into instruction "groups" 202, examples of which are depicted in FIG. 2. Each instruction group 202 includes a set of instruction slots 204a, 204b, etc. (collectively or generically referred to as instruction slots 204). The organization of a set of instructions into instruction groups facilitates high-speed execution by, among other things, simplifying the logic needed to maintain completion tables for a large number of in-flight instructions.

In one embodiment, the instruction address of just a single instruction in the instruction group 202 is maintained during the pendency of the instruction group (i.e., during the time when the instructions in instruction group 202 are in flight). The single instruction address that is retained may be the address of the instruction stored in first slot 204a of instruction group 202. In this embodiment, the regeneration of an instruction address for any instruction other than the instructions stored in first slot 204a will require additional effort because the instruction addresses for all other instructions in instruction group 202 have been discarded.

In FIG. 2, three examples of instruction grouping that may be performed by cracking logic 112 are depicted. In Example 1, a set of instructions indicated by reference numeral 201 is transformed into a single instruction group 202 by cracking logic 112. In the depicted embodiment, each instruction group 202 includes five slots indicated by reference numerals 204a, 204b, 204c, 204d, and 204e (generically or collectively referred to as instructions slot(s) 204), each of which may contain a single instruction.

The organization of sets of instructions into instruction groups simplifies renaming recovery and completion table logic by reducing the number of instructions that must be individually tagged and tracked. The use of instruction groups thus contemplates sacrificing some information about each instruction in an effort to simplify the process of tracking pending instructions in an out-of-order processor. One implication of this arrangement is that it will not always be possible to determine the instruction address of an instruction in an instruction group 202. More specifically, in the preferred embodiment, the only instruction address that is maintained is the address of the first instruction in the instruction group. As long as instructions are executing and completing without generating exceptions, the instruction address information is not necessary for the proper execution of the program and, therefore, the sacrifice of this information is generally acceptable if the "exception probability" of each instruction is relatively low. Arithmetic instructions such as ADD instructions have an exception probability that is essentially equal to zero. Memory reference instructions such as load and store instructions may cause exceptions under a variety of circumstances, such as when, as an example, a required memory reference is not available in the processor's data cache. A number of techniques are well known, however, to reduce the probability of such cache miss exceptions, address translations exceptions, and other types of exceptions that memory reference instructions may generate. Branch instructions, on the other hand, tend to have a relatively high exception probability due to their speculative nature. To address the relatively high exception probability of branch instructions, one embodiment of processor 100 mandates that the last slot in instruction group 202 (slot 204e in the depicted embodiment) is reserved for branch instructions only. This requirement is met in the Example 1 depicted in FIG. 2 by inserting a NOP in slot 204d between the ADD instruction and the branch instruction. By placing instructions with a high exception probability, such as branch instructions, in the last available slot 204 of group 202, cracking logic 112 guarantees that the instruction address of an instruction that follows a branch instruction will be in the first slot of a subsequent instruction group thereby guaranteeing that the instruction address of an instruction following a branch is readily available in case the branch was mispredicted.

A second example of grouping preformed by cracking logic 112 according to one embodiment of the invention is shown in Example 2 of FIG. 2. This example demonstrates the capability of cracking logic 112 to break down complex instructions into a group of simple instructions for higher speed execution. In the depicted example, a sequence of two load-with-update (LDU) instructions are broken down into an instruction group including a pair of load instructions in slots 204a and 204c respectively and a pair of ADD instructions in slots 204b and 204d respectively. In this example, because group 202 does not contain a branch instruction, the last slot 204e of instruction group 202 contains no instruction.

The PowerPC® load-with-update instruction, like analogous instructions in other instruction sets, is a complex instruction in that the instruction affects the contents of multiple general purpose registers (GPRs). Specifically, the load-with-update instruction can be broken down into a load instruction that affects the contents of a first GPR and an ADD instruction that affects the contents of a second GPR. Thus, in instruction group 202 of example two in FIG. 2, instructions in two or more instruction slots 204 correspond to a single instruction received by cracking unit 112.

In Example 3, a single instruction entering cracking unit 112 is broken down into a set of instructions occupying multiple groups 202. More specifically, Example 3 illustrates a load multiple (LM) instruction. The load multiple instruction (according to the PowerPC® instruction set) loads the contents of consecutive locations in memory into consecutively numbered GPRs. In the depicted example, a load multiple of six consecutive memory locations breaks down into six load instructions. Because each group 202 according to the depicted embodiment of processor 100 includes, at most, five instructions, and because the fifth slot 204e is reserved for branch instructions, a load multiple of six registers breaks down into two groups 202a and 202b respectively. Four of the load instructions are stored in the first group 202a while the remaining two load instructions are stored in the second group 202b. Thus, in Example 3, a single instruction is broken down into a set of instructions that span multiple instruction groups 202.

Returning now to FIG. 1, the wide instructions generated in the preferred embodiment of cracking unit 112 are forwarded to dispatch unit 114. Dispatch unit 114 is responsible for determining which instructions are ready for execution and forwarding the executable instructions to each issue queue 120. In addition, dispatch unit 114 communicates with dispatch and completion control logic 116 to keep track of the order in which instructions were issued and the completion status of these instructions to facilitate out-of-order execution. In the embodiment of processor 100 in which cracking unit 112 organizes incoming instructions into instruction groups as discussed above, each instruction group 202 is assigned a group tag (GTAG) by dispatch completion and control logic 116 that conveys the ordering of the issued instruction groups.

Dispatch unit 114 may assign monotonically increasing values to consecutive instruction groups. With this arrangement, instruction groups with lower GTAG values are known to have issued prior to (i.e., are younger than) instruction groups with larger GTAG values. In association with dispatch and completion control logic 116, a completion table 118 is utilized in one embodiment of the present invention to track the status of issued instruction groups.

Figure 3:
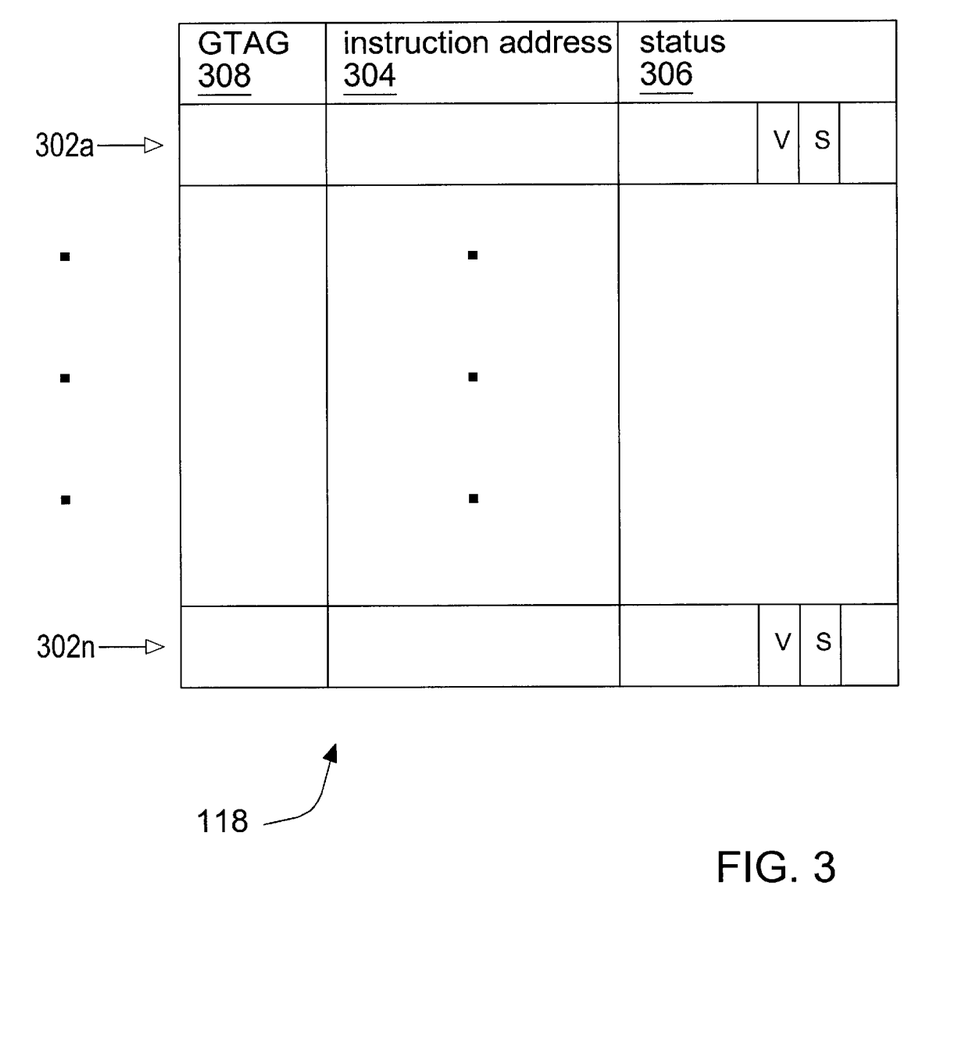
FIG. 3 is a simplified representation of a first embodiment of a completion table suitable for use in the processor of FIG. 1.
Figure 4:
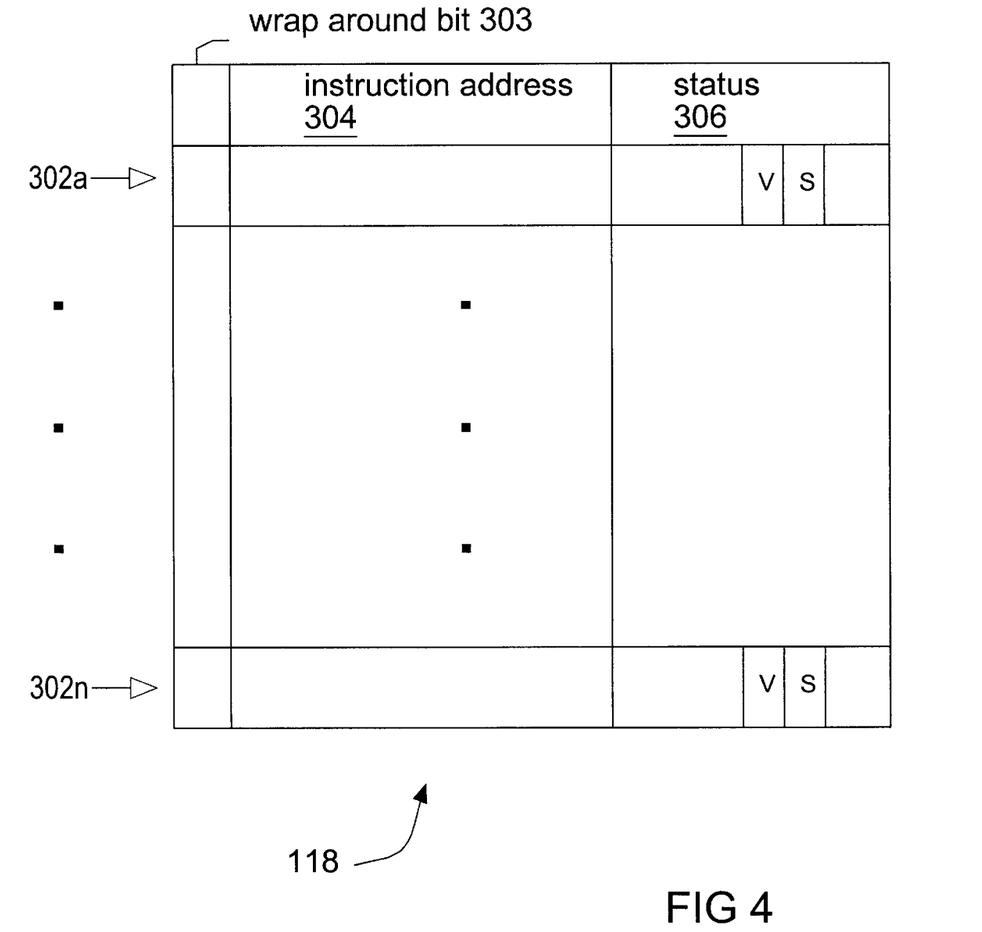
FIG. 4 is a simplified representation of a second embodiment of a completion table suitable for use in the processor of FIG. 1.

Turning to FIGS. 3 and 4, simplified block diagrams of completion table 118 according to alternative embodiments are presented. In the embodiment depicted in FIG. 3, completion table 118 includes a set of entries 302a through 302n (collectively or generically referred to herein as completion table entry(ies) 302). In this embodiment, each entry 302 includes a GTAG field 308, an instruction address (IA) field 304 and a status bit field 306. Each GTAG field 308 contains the GTAG value of a corresponding instruction group 202. In another embodiment of completion table 118 (depicted in FIG. 4), the GTAG field 308 is eliminated. In this embodiment, the GTAG value is constrained to an integer less than or equal to the number of entries 302 in completion table 118. The GTAG value itself identifies the entry 302 in which the corresponding instruction group resides. Thus, the instruction group stored in entry 1 of completion table 118 will have a GTAG value of one. In this embodiment of completion table 118 completion table 118 may further include a "wrap around" bit to indicate that an instruction group with a lower GTAG value is actually younger than an instruction group with a higher GTAG value. In one embodiment, the instruction address field 304 includes the address of the instruction in first slot 204a of the corresponding instruction group 202. Status field 306 may contain one or more status bits indicative of whether, for example, the corresponding entry 302 in completion table 118 is available or if the entry has been allocated to a pending instruction group. Status field 306 may include, for example, a valid bit (V) and a sample bit (S). In this embodiment, the valid bit V may indicate whether a corresponding instruction has been committed to an architectural register while the sample bit S may indicate whether a corresponding instruction is selected for performance monitoring. These bits are described in greater detail below with respect to FIG. 5.

In the embodiment of processor 100 depicted in FIG. 1, instructions are issued from dispatch unit 114 to functional units 121 for execution. Each functional unit 121 includes an issue queue 120 suitable for storing instructions pending execution and a corresponding execution pipe 122. Processor 100 may include a variety of types of execution pipes, each designed to execute a subset of the processor's instruction set. In one embodiment, execution pipes 122 may include a branch unit pipeline (BRU) 124, a load store pipeline (LSU) 126, a fixed point arithmetic unit (FXU) 128, and a floating point unit (FPU) 130. Each execution pipe 122 may comprise two or more pipeline stages. Instructions stored in issue queues 120 may be issued to execution pipes 122 using any of a variety of issue priority algorithms. In one embodiment, for example, the oldest pending instruction in an issue queue 120 is the next instruction issued to execution pipes 122. In this embodiment, the GTAG values assigned by dispatch unit 114 are utilized to determine the relative age of instructions pending in the issue queues 120.

When an instruction is ultimately forwarded from issue queues 120 to the appropriate execution pipe 122, the execution pipe performs the appropriate operation as indicated by the instruction's opcode and writes the instruction's result to the instruction's rename GPR by the time the instruction reaches a finish stage (indicated by reference numeral 132) of the pipeline. A mapping is maintained between the rename GPRs and their corresponding architected registers. When all instructions in an instruction group (and all instructions in younger instruction groups) finish without generating an exception, a completion pointer in the completion table 118 is incremented to the next instruction group. When the completion pointer is incremented to a new instruction group, the rename registers associated with the instructions in the old instruction group are released thereby committing the results of the instructions in the old instruction group. If it is determined that one or more instructions older than a finished (but not yet committed) instruction generated an exception, the instruction generating the exception and all younger instructions are flushed and a rename recovery routine is invoked to return the GPRs to a valid value.

In the depicted embodiment, processor 100 includes a performance monitor unit 150 that receives one or more signals from the various execution pipes 122. Typically, each signal received by performance monitor 150 indicates the occurrence of an event that occurred during the execution of an instruction. Performance monitor unit 150 may include one or more performance monitor control registers (PMCRs) 152 for selecting the types of events that are to be monitored and a set of one or more performance monitor counter (PMC) registers 151 in which occurrences of a selected event are recorded. Performance monitor unit 150 provides a facility by which details of the operation of processor 100 may be measured and recorded for subsequent analysis or debug. Further illustrative information about one implementation of performance monitor unit 150 is disclosed in the related application cited above and incorporated by reference herein.

Figure 5:
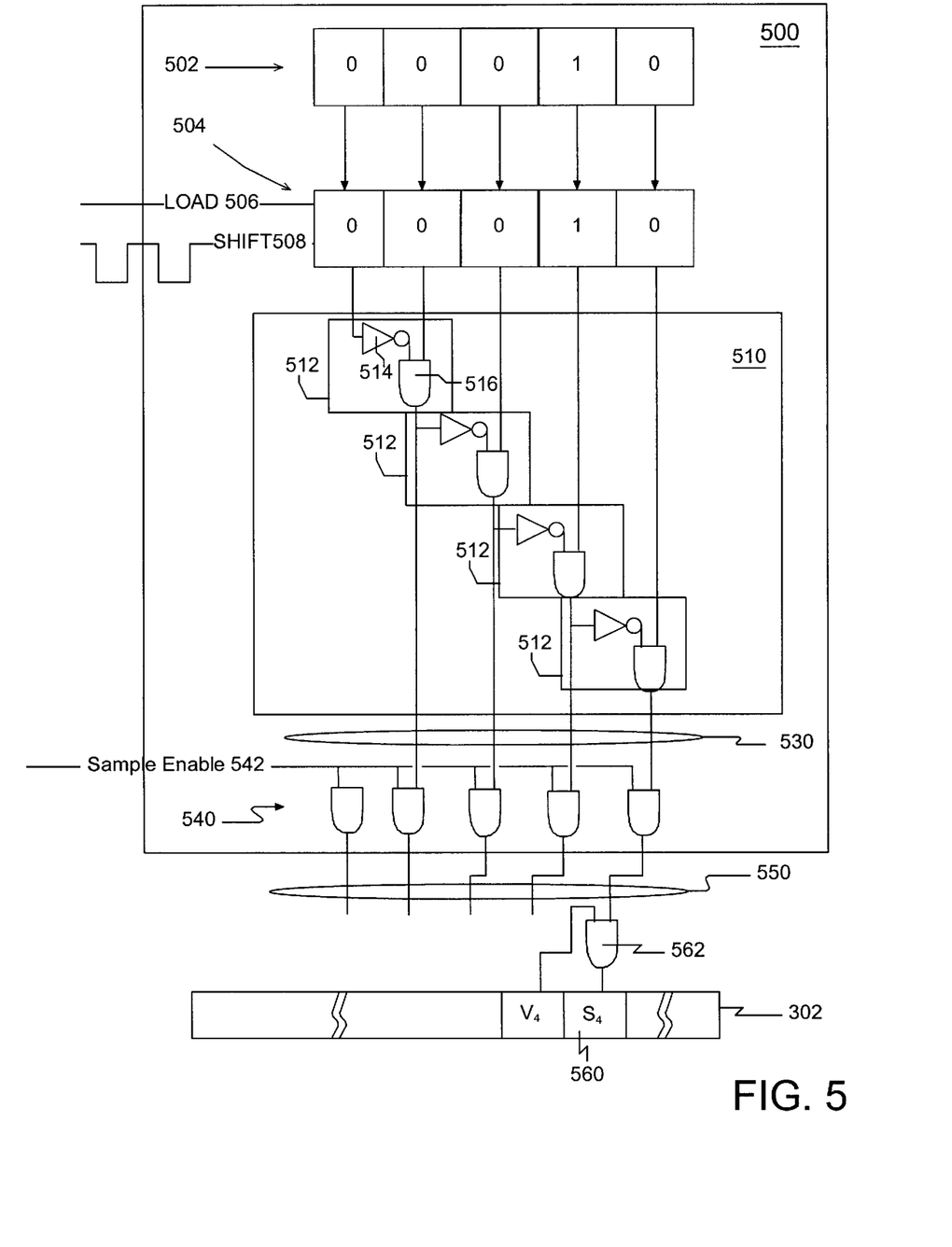
FIG. 5 is a block diagram of an instruction sampling circuit according to one embodiment of the invention.

In one embodiment, dispatch unit 114 includes the instruction sampling circuit 500 depicted in FIG. 5. Instruction sampling circuit 500 operates in conjunction with performance monitor unit 150 to monitor the performance of selected instructions. In an embodiment suitable for use in a processor 100 that organizes instructions into instruction groups 202, sampling circuit 500 is enabled to select an instruction from an instruction group 202 for performance monitoring. When the instruction group 202 is dispatched for execution, performance monitor unit 150 will monitor the operation of the selected instruction. In the preferred embodiment, sampling circuit 500 identifies an instruction group slot 204 for each instruction group 202. If the instruction group 202 contains a valid instruction in the slot 204 identified by sampling circuit 500, that instruction is tagged for performance monitoring. Preferably, the slot 204 selected by sampling circuit 500 may vary with each instruction group 202 in a random or pseudo-random manner. By randomizing the selection of monitored instructions, sampling circuit 500 is more likely to generate performance data that is representative of the instructions that are contained in the application itself. For a variety of reasons, sampling instructions for monitoring based upon, for example, instruction type or the instruction's position in an internal queue may produce performance data based upon a sample of instructions that is not truly representative of an application.

As depicted in FIG. 5, sampling circuit 500 includes a software programmable input mask 502 connected to a selection mask 504. Upon appropriate transition of a load signal 506 received by sampling circuit 500, the contents of input mask 502 are transferred to selection mask 504. Typically, the number of bits in input mask 502 and the number of bits in selection mask 504 are the same. In addition, the number of bits in selection mask 504 typically bears some relationship to the arrangement of instructions within processor 100. In an embodiment suitable for use with the processor 100 described herein, the bit width of selection mask 504 is equal to the maximum number of instructions in an instruction group 202. If, for example, an instruction group 202 includes a maximum of five instructions (i.e. five slots 204), selection mask 504 is preferably five bits wide such that each bit in selection mask 504 corresponds to an instruction slot 204 in instruction group 202.

Input mask 502 enables a user to control the initial condition of selection mask 504. Typically, a programmed value with selection mask 504 of "1" indicates that a corresponding instruction may be sampled whereas a programmed "0" indicates no sampling. In one embodiment, selection mask 504 is implemented as a shift register that is driven by a shift signal 508. Upon each appropriate transition of shift signal 508, the bits within selection mask 504 rotate by one bit position (with the end bit being rotated to the opposite end). Thus, if selection mask 504 is implemented as a shift right register, the right most bit position is shifted to the left most bit position while all other bits are shifted to the right. Shift signal 508 may be derived from various signals. As an example, shift signal 508 may be derived from the processor clock signal such that the bits in selection mask 504 shift each clock cycle. In another embodiment, a group dispatch signal that is asserted each time dispatch unit 114 dispatches a new instruction group 202 controls shift signal 508.

In the preferred embodiment, the number of bits in selection mask 504 is at least as great as the number of instructions that the processor can dispatch in a single cycle. Thus, if the processor 100 can dispatch five instructions in a cycle, selection mask 504 is typically at least five bits wide. In one embodiment, -the asserted bits of selection mask 504 indicate the instructions in an instruction group 202 that are eligible for sampling. If multiple bits within selection mask 504 are asserted and each asserted bit corresponds to a valid instruction in an instruction group 202, then multiple instructions are eligible for sampling.

In one embodiment, a maximum of one eligible instruction per instruction group is actually sampled. In this embodiment, the ability to assert multiple bits in selection mask 504 may still be desirable to increase the probability of sampling an instruction from each instruction group 202. Since an instruction group 202 may include slots 204 that do not contain a valid instruction and the asserted bits in selection mask 504 are shifting, there may be occasions when none of the asserted bits in selection mask 504 correspond to valid instructions in instruction group 202. As the number of asserted bits in selection mask 504 is increased, the probability of matching an asserted selection mask bit with a valid instruction increases as well. At the other extreme, however, the randomness of the instruction sampling process may decrease as the number of asserted bits in selection mask 504 increases. If, for example, all bits in selection mask 504 were asserted, then the number of eligible instructions in each instruction group 202 would equal the number of valid instructions in the instruction group. In cases where there are multiple valid instructions in a single instruction group 202, some method of selecting the single instruction for sampling would presumably be required. If processor 100 used a simple selection scheme in which, for example, the left-most eligible instruction in an instruction group 202 becomes the sampled instruction, the assertion of too many bits in selection mask 504 would result in excessive monitoring of the instruction in first slot 504*a*.

To balance the desire to sample a large number of instructions with the desire to increase the randomness of the instruction selection process, the instruction sampling circuit 500 permits the setting of multiple bits in selection mask 504, but filters out all but one of the asserted bits in a sampling filter 510. Sampling filter 510 typically receives an n-bit word from selection mask 504 and generates an n-bit filter output vector 530 that contains a single asserted bit. In the depicted embodiment, sampling filter 510 selects the most significant (i.e., left most) asserted bit in selection mask 504. The instruction slot 204 in instruction group 202 corresponding to the bit selected by filter 510 is the eligible instruction slot. If the eligible instruction slot contains a valid instruction, performance-monitoring unit 150 monitors the performance of that instruction when it executes.

In the depicted embodiment, filter 510 includes a set of circuits 512*a*, 512*b*, 512*c*, and 512*d* (generically or collectively referred to herein as circuit(s) 512) connected between each pair of adjacent bit positions in selection mask 504. The set of circuits 512 are configured to ripple a "0" through each bit position in filter output vector 530 that is to the right of the left-most asserted bit in selection mask 504. Thus, filter 510 detects the position of the first asserted bit (starting from the left) in selection mask 504. Filter 510 passes the first asserted bit (as well as any cleared bits that precede the first asserted bit) through to filter output vector 530 unchanged and clears all bit positions to the right of the first asserted bit. Each circuit 512 includes an inverter 514 and a 2-input AND gate 516. The output of inverter 514 provides one of the inputs to AND gate 516. The inverter 514 receives its input from the output of the AND gate 516 in preceding circuit 512. The input to the first inverter 514a of the left most circuit 512a receives its input from the left most bit of selection mask 504.

The filter output vector 530 is ANDed via a set of AND gates 540 with a sample enable signal 542 to produce a selection vector 550. The sample enable signal 542 may reflect the status of a programmable control register bit of processor 100. Alternatively, sample enable signal 542 may comprise the output of a hardware or software module that determines when to initiate instruction sampling based upon predetermined processor events.

When sampling is enabled, the selection vector 550 is equivalent to the filter output vector 530. In one embodiment, selection vector 550 is used to program a set of sample bits 560 (one of which is illustrated in FIG. 5) in an entry 302 of completion table 118. In the depicted embodiment, each entry 302 in completion table 118 includes information about the group of instructions corresponding to the entry 302. This instruction information includes a sample bit and a valid bit for each instruction in the instruction group. Each bit in selection vector 550 is ANDed together with a corresponding valid bit in entry 302. If the selection vector bit is set and the corresponding instruction is valid, the instruction sample bit is set in completion table entry 320. When processor 100 executes the corresponding instruction, the asserted sample bit may provide an input to various circuits in processor 100 to enable performance monitoring or some other analysis or debug facility.

In this manner, processor 100 includes the ability to monitor the performance of instructions selected based upon the position of one or more asserted bits within a rotating selection mask. The rotation of the bits in selection mask randomizes the selection the sample of instructions selected for monitoring. If, for example, instructions of a certain type are more likely to occupy certain slots 202 in an instruction group 204, the rotation of the selection mask reduces the likelihood over-sampling and under-sampling of these instructions.

Those skilled in the field of microprocessor having the benefit of this disclosure will appreciate that the depicted embodiment of processor includes facilities for optimizing the sampling of instructions for monitoring. It is understood that the form of the invention shown and described in the detailed description and the drawings are to be taken merely as presently preferred examples. The following claims should be interpreted broadly to embrace all the variations of the preferred embodiments disclosed.

What is claimed is:

1. A microprocessor comprising:
   a dispatch unit configured to forward instructions comprising an instruction group to at least one functional unit for execution;
   sampling logic configured to select an instruction from the instruction group for performance monitoring based upon the slot within the instruction group in which the selected wherein the sampling logic generates a selection vector comprising a single asserted bit indicative of the instruction group slot in which the selected instruction is located; and
   a performance monitor unit configured to receive from the functional unit at least one signal indicative of an event occurring during execution of an instruction and further configured to record the occurrence of the event if the instruction was selected for performance monitoring.

2. The microprocessor of claim 1, wherein an initial condition of the selection vector is derived from a programmable input mask.

3. The microprocessor of claim 2, wherein the programmable input mask is transferable to a selection mask from which the selected instruction is determined and wherein the contents of the selection mask vary with time.

4. The microprocessor of claim 3, wherein selection mask is applied to a filter to produce the selection vector, wherein the filter selects a single asserted bit from the asserted bits in the selection mask.

5. The microprocessor of claim 4, wherein the filter selects the most significant asserted bit in the selection mask.

6. The microprocessor of claim 1, wherein the sampling logic includes a shift register comprising a bit position corresponding to each instruction group slot and wherein the selected instruction is determined from the shift register.

7. The microprocessor of claim 6, wherein the shift register shifts periodically and further wherein shifts in the shift register affect the selected vector.

8. The microprocessor of claim 1, wherein the sampling logic sets a bit indicative of the selected instruction in a completion table entry corresponding to the instruction group.

9. A data processing system including processor, memory, display, and input means, the processor comprising:
   a dispatch unit configured to forward instructions comprising an instruction group to at least one functional unit for execution;
   sampling logic configured to select an instruction from the instruction group for performance monitoring based upon the slot within the instruction group in which the selected wherein the sampling logic generates a selection vector comprising a single asserted bit indicative of the instruction group slot in which the selected instruction is located; and
   a performance monitor unit configured to receive from the functional unit at least one signal indicative of an event occurring during execution of an instruction and further configured to record the occurrence of the event if the instruction was selected for performance monitoring.

10. The data processing system of claim 9, wherein an initial condition of the selection vector is derived from a programmable input mask.

11. The data processing system of claim 10, wherein the programmable input mask is transferable to a selection mask from which the selected instruction is determined and wherein the contents of the selection mask vary with time.

12. The data processing system of claim 11, wherein the selection mask is applied to a filter to produce the selection vector, wherein the filter selects a single asserted bit from the asserted bits in the selection mask.

13. The data processing system of claim 9, wherein the sampling logic includes a shift register comprising a bit position corresponding to each instruction group slot and wherein the selected instruction is determined from the shift register.

14. A method of executing instructions in a microprocessor, comprising:
   grouping a set of instructions into an instruction group and assigning an entry corresponding to the instruction group in a completion table;
   selecting an instruction from the instruction group for performance monitoring based upon the instruction position within the instruction group, wherein selecting the instruction for performance monitoring includes generating a selection vector with a single asserted bit indicative of the selected instruction; and recording the occurrence of an event associated with the selected instruction when the selected instruction is executed.

15. The method of claim 14, wherein the selected instruction position varies from instruction group to instruction group.

16. The method of claim 14, wherein generating the selection vector includes filtering all but one asserted bit from a selection mask comprising at least one asserted bit.

17. The method of claim 16, wherein filtering all but one asserted bit from the selection mask includes clearing all asserted bits except for the most significant asserted bit in the selection mask.

* * * * *

UNITED STATES PATENT AND TRADEMARK OFFICE
CERTIFICATE OF CORRECTION

PATENT NO. : 6,748,522 B1
DATED : June 8, 2004
INVENTOR(S) : Dennis Gerard Gregoire, Alexander Erik Mericas and Joel M. Tendler It is certified that error appears in the above-identified patent and that said Letters Patent is hereby corrected as shown below:

Column 10,
Line 27, claim 9, should read as follows:

A data processing system including processor, memory, display, and input means, the processor comprising:

a dispatch unit configured to forward instructions comprising an instruction group to at least one functional unit for execution;

sampling logic configured to select an instruction from the instruction group for performance monitoring based upon the slot within the instruction group in which the selected instruction is located;

wherein the sampling logic generates a selection vector comprising a single asserted bit indicative of the instruction group slot in which the selected instruction is located; and     a performance monitor unit configured to receive from the functional unit at least one signal indicative of an event occurring during execution of an instruction and further configured to record the occurrence of the event if the instruction was selected for performance monitoring.

Signed and Sealed this

Fourth Day of January, 2005

JON W. DUDAS
*Director of the United States Patent and Trademark Office*